Jan. 20, 1925.
J. M. PETERSON
1,523,892
BATTERY DISCHARGE TEST SET
Filed April 11, 1922
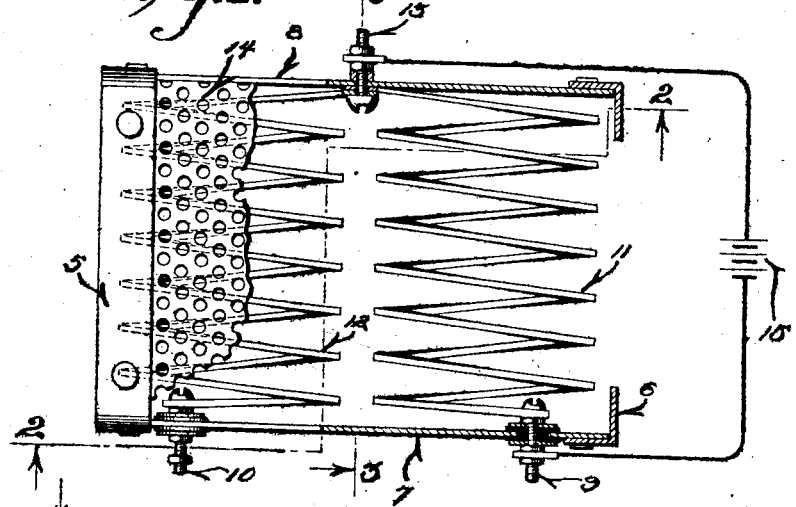
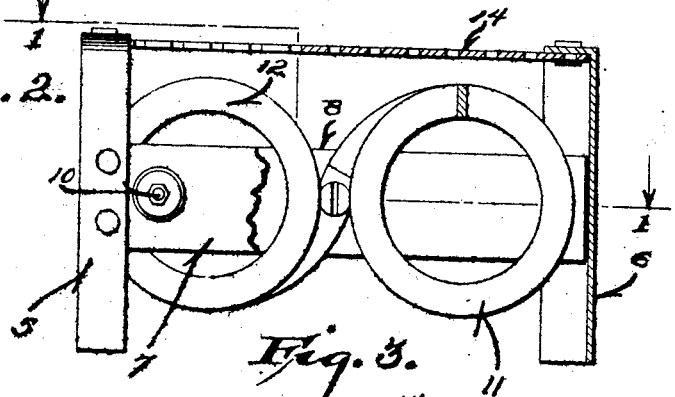
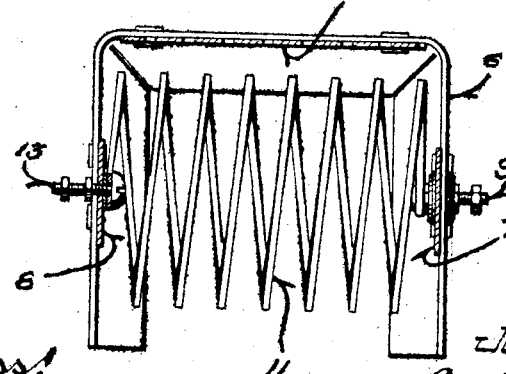

Patented Jan. 20, 1925.

1,523,892

UNITED STATES PATENT OFFICE.

JOHN M. PETERSON, OF MILWAUKEE, WISCONSIN.

BATTERY-DISCHARGE TEST SET.

Application filed April 11, 1922. Serial No. 551,577.

*To all whom it may concern:*

Be it known that I, JOHN M. PETERSON, a citizen of the United States, and resident of Milwaukee, in the county of Milwaukee and State of Wisconsin, have invented certain new and useful Improvements in Battery-Discharge Test Sets; and I do hereby declare that the following is a full, clear, and exact description thereof.

My invention relates to a battery discharge test set which is more particularly adapted to be used for testing batteries at high discharge rates to determine their approximate capacity.

In using a test set constructed according to my invention, an ammeter is not needed since the current is always definitely determined by the manner in which the connections are made but a voltmeter should be used to determine the condition of each cell while discharging.

The general object of my invention is to simplify and otherwise improve the construction of a tester of this type, whereby the same may be manufactured at a minimum cost and at the same time will be strong and durable and fulfill the purpose as efficiently as those of more expensive construction.

With the above and other objects in view my invention consists in certain details of construction, which will be described in connection with the accompanying drawings and subsequently claimed.

In the drawings,—

Figure 1 represents a plan view, partly in section, of my invention connected with a battery to be tested, the section being taken substantially on the line 1—1 of Figure 2.

Figure 2 is an elevational view of the same, partly in section, on the line 2—2 of Figure 1, and Figure 3 is a cross sectional view on the line 3—3 of Figure 1.

Referring more specifically to the drawings, the invention comprises a skeleton frame-work including the end frames 5 and 6, which are suitably connected by the cross bars 7 and 8. On one of the cross bars, as 7, are secured a plurality of binding posts 9 and 10 which are suitably insulated. To these binding posts are connected ribbon resistance coils 11 and 12 of known resistance and in the opposite cross bar 8 is secured a common binding post 13 to which both coils are secured. The coils are suitably protected by a perforated housing plate 14.

In using my device the battery 15 may be connected, as shown, to the binding posts 9 and 13, whereupon the discharge will take place through the resistance coil 11. Preferably the resistance of the coil 11 is such that when connected in this manner, a current of 150 amperes will flow from the battery, this being the average current required to operate a six volt starting motor.

A volt meter should be used to determine the condition of the cells while discharging. A six volt eleven plate battery of full rated capacity should stand a discharge on these connections for about 14 minutes before the voltage falls to 1.6 in any cell. To obtain a discharge rate of 300 amperes, one terminal will be connected to both binding posts 9 and 10, while the other terminal is connected to the binding post 13. When connected in this manner, the coils 11 and 12 will be in parallel and the amperage of the discharge will be double that of the first mentioned arrangement. To obtain a discharge rate of 75 amperes, the terminals will be connected to the binding posts 9 and 10, respectively, whereby the coils 11 and 12 will be arranged in series and the amperage will be only half that of the first mentioned arrangement. Other discharge rates may easily be obtained by changing the connections and the number of cells.

It will be seen that the resistant ribbons are arranged with their planes substantially vertical and thereby secure a rapid circulation of air, preventing the excessive heating of the coils. The open formation of the framework facilitates this action and the perforated top protects the coils from mechanical injury.

From the foregoing description, it will be seen that I have provided a very simple arrangement by means of which a single unit may be used as a discharge test for any of the ordinary sizes of storage batteries simply by connecting the same in different ways, as described.

While I have shown and described one specific construction by means of which my invention may be carried out, it will, of course, be understood that various changes may be made in the structural details without departing from the spirit of the invention.

I claim:—

1. A testing resistance for storage batteries comprising an open frame, a pair of coils formed of flat ribbon with the plane of the ribbon substantially vertical, one terminal of each of the coils being joined to form a common terminal, and binding posts insulated from and passing through the frame at each of the other terminals and at the common terminal, said binding posts being electrically connected to the terminals and insulated from the frame.

2. A testing resistance for storage batteries comprising an open frame, a pair of coils formed of flat ribbon with the plane of the ribbon substantially vertical, one terminal of each of the coils being joined to form a common terminal, binding posts insulated from and passing through the frame at each of the other terminals and at the common terminal, said binding posts being electrically connected to the terminals and insulated from the frame, and a perforated top for said frame for mechanically protecting the coils and allowing a free circulation of air.

In testimony that I claim the foregoing I have hereunto set my hand at Milwaukee, in the county of Milwaukee and State of Wisconsin.

JOHN M. PETERSON.